United States Patent
Rabovitser et al.

(10) Patent No.: US 7,926,292 B2
(45) Date of Patent: Apr. 19, 2011

(54) PARTIAL OXIDATION GAS TURBINE COOLING

(75) Inventors: Iosif K Rabovitser, Skokie, IL (US);
Serguei Nester, Tyngsboro, MA (US);
Stanley Wohadlo, Lansing, IL (US);
Mehmet Tartan, Greenville, SC (US)

(73) Assignee: Gas Technology Institute, Des Plaines, IL (US)

( * ) Notice: Subject to any disclaimer, the term of this patent is extended or adjusted under 35 U.S.C. 154(b) by 677 days.

(21) Appl. No.: 12/051,082

(22) Filed: Mar. 19, 2008

(65) Prior Publication Data
US 2009/0235671 A1 Sep. 24, 2009

(51) Int. Cl.
*F02C 7/12* (2006.01)

(52) U.S. Cl. .................. 60/806; 60/730; 60/736

(58) Field of Classification Search .......... 60/806, 60/736, 730, 39.463, 39.465
See application file for complete search history.

(56) References Cited

U.S. PATENT DOCUMENTS

| | | | | |
|---|---|---|---|---|
| 2,636,345 A * | 4/1953 | Zoller | .......... | 60/39.55 |
| 5,259,196 A * | 11/1993 | Faulkner et al. | .......... | 60/599 |
| 5,272,867 A * | 12/1993 | Emsperger | .......... | 60/775 |
| 5,279,111 A | 1/1994 | Bell et al. | | |
| 5,313,783 A * | 5/1994 | Althaus | .......... | 60/39.181 |
| 5,802,841 A | 9/1998 | Maeda | | |
| 5,950,417 A * | 9/1999 | Robertson et al. | .......... | 60/776 |
| 5,987,876 A * | 11/1999 | Ziegner | .......... | 60/776 |
| 6,142,730 A | 11/2000 | Tomita et al. | | |
| 6,357,217 B1 * | 3/2002 | Griffin | .......... | 60/780 |
| 6,988,367 B2 * | 1/2006 | Thompson Jr. et al. | .......... | 60/772 |
| 2006/0032228 A1 * | 2/2006 | Marin et al. | .......... | 60/730 |
| 2007/0089423 A1 * | 4/2007 | Norman et al. | .......... | 60/772 |

* cited by examiner

*Primary Examiner* — William H Rodriguez
(74) *Attorney, Agent, or Firm* — Mark E. Fejer

(57) ABSTRACT

A power generation system and method in which a fuel gas is introduced into a combustor and at least a portion of the fuel gas is combusted in the combustor, producing an exhaust gas having no appreciable available oxygen. The exhaust gas is introduced as a working fluid into a gas turbine, thereby generating power. Cooling of the power generation system is accomplished using a cooling fluid selected from the group consisting of synthesis gas, natural gas, natural gas/steam mixture, flue gas, flue gas/steam mixture, and mixtures thereof.

16 Claims, 7 Drawing Sheets

PARTIAL OXIDATION GAS TURBINE COOLING

BACKGROUND OF THE INVENTION

1. Field of the Invention

This invention relates to a method and system for generating power. This invention relates to a method and system for generating power using gas turbines. This invention relates to a method and system for generating power using partial oxidation gas turbines. This invention relates to a method and system for generating power employing non-conventional cooling fluids for cooling the components of the power generation system.

2. Description of Related Art

In order to increase thermal efficiency, modern gas turbines operate at increased working temperatures which could be as high as 2700° F., and gas turbine manufacturers are working on designs capable of operating at turbine inlet temperatures up to about 3000° F. Conventional turbine cooling is accomplished through the use of internally cooled turbine blade and vane construction wherein a cooling fluid is circulated through the internal flow passages of the turbine components. See, for example, U.S. Pat. No. 5,279,111 Application of gas turbine cooling allows gas turbines to operate at temperatures exceeding normal material temperature limits. In conventional gas turbines, air from the compressor or externally generated steam is employed for turbine component cooling so as to maintain the metal temperatures within their design limits, usually in the range of 1500° F. to 1700° F., depending upon the alloys used to manufacture the turbine components.

In a partial oxidation gas turbine (POGT), the conventional combustor of a gas turbine is replaced with a non-catalytic partial oxidation reactor (POR) in which natural gas or another fuel is combusted with compressed air at substoichiometric conditions. Typically fueled by natural gas, the partial oxidation gas turbine can provide high-efficiency electricity generation from expansion of the hot, pressurized partial oxidation products through the gas turbine, while producing an exhaust consisting of a high-temperature fuel gas, such as a hydrogen-rich fuel gas. This clean, hydrogen-rich fuel gas is suitable for use in fuel cells, existing fossil fuel-fired furnaces, boilers, conventional gas turbine engines, and for hydrogen and syngas production. However, in contrast with conventional gas turbines, direct air cooling of partial oxidation gas turbine components is problematic because the working fluid is a hot, combustible fuel gas. As a result, the only remaining conventional cooling option available is the utilization of steam as a cooling fluid. However, the utilization of steam cooling reduces the thermal efficiency of the partial oxidation gas turbine system.

SUMMARY OF THE INVENTION

Accordingly, it is one object of this invention to provide a method and system for increasing the thermal efficiency of partial oxidation gas turbines.

It is another object of this invention to provide a method and system for increasing turbine lifetime compared with conventional gas turbines.

These and other objects of this invention are addressed by a power generation system comprising a partial oxidation gas turbine comprising a combustor and a gas turbine and comprising cooling means for cooling the combustor and/or the gas turbine. The cooling means comprises a cooling fluid selected from the group consisting of synthesis gas (also referred to herein as synfuel and syngas), natural gas, natural gas/steam mixture, flue gas, flue gas/steam mixture, and mixtures thereof. As will be discussed in detail herein below, the use of these cooling fluids provides a substantial amount of flexibility with respect to system configurations, enabling use of the partial oxidation gas turbine in a number of different settings.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention claimed herein is a method and system for power generation in which a fuel gas, e.g. synthesis gas, also referred to herein as a synfuel, or natural gas, is introduced into a combustor and at least a portion of the fuel gas is combusted in the combustor in a manner so as to produce an exhaust gas having no appreciable free oxygen. The substantially oxygen-free exhaust gas is introduced as a working fluid into a gas turbine having a turbine exhaust gas inlet and a turbine exhaust gas outlet, thereby generating power. At least one of the combustor and the gas turbine is cooled using a cooling fluid selected from the group consisting of synthesis gas, natural gas, natural gas/steam mixture, flue gas, flue gas/steam mixture, and mixtures thereof. In accordance with one particularly preferred embodiment, combustion of the fuel gas in the combustor is carried out at substoichiometric conditions to ensure that no available oxygen is present in the exhaust gases. It will be appreciated by those skilled in the art that substoichiometric conditions are not a requirement of this invention so long as the exhaust gas from the combustor is substantially free of available oxygen. In accordance with one preferred embodiment of this invention, a portion of the fuel gas is diverted for use as a cooling fluid for the combustor or gas turbine. In accordance with another embodiment of this invention, the exhaust gases from the gas turbine are introduced into a bottoming cycle in which flue gas is generated for use as a cooling fluid. In accordance with another embodiment of this invention, the cooling fluid is a natural gas/steam mixture; and in accordance with yet another embodiment, the cooling fluid is a flue gas/steam mixture.

Figure 1:
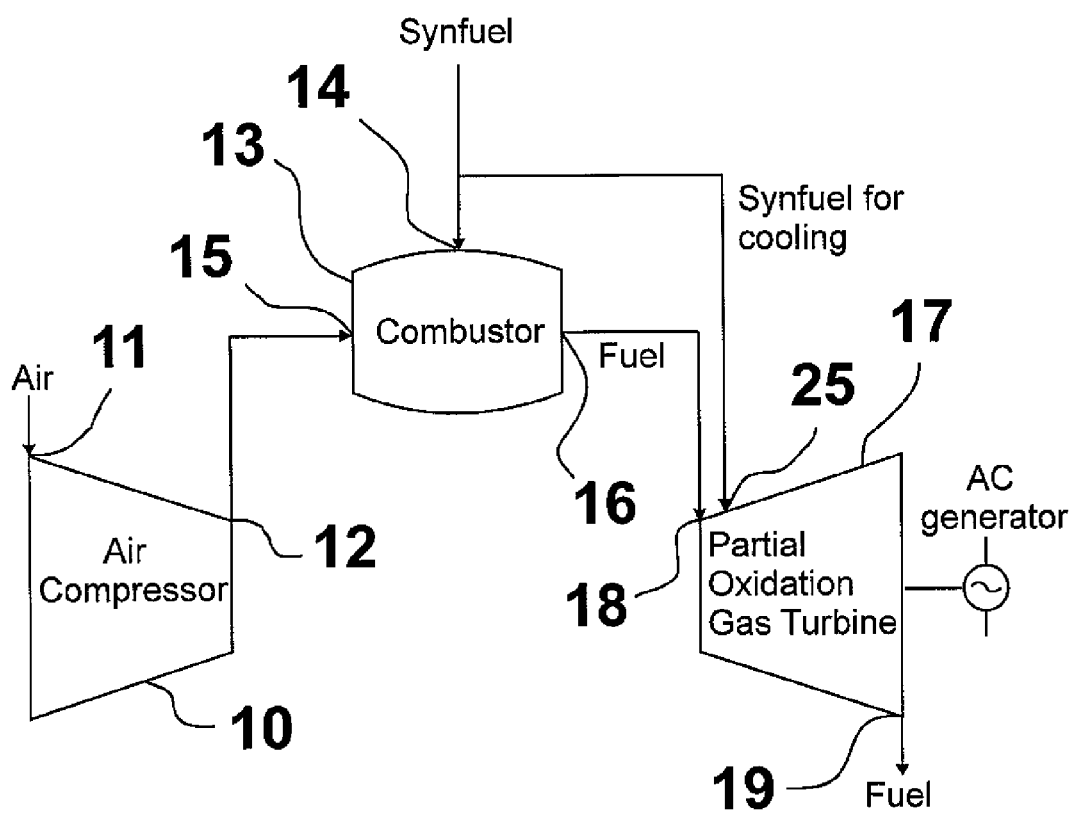
FIG. 1 is a schematic diagram of a power generation system in which a synthesis gas is utilized as a cooling fluid for a partial oxidation gas turbine in accordance with one embodiment of this invention.

FIG. 1 is a schematic diagram showing a power generation system in accordance with one embodiment of this invention. As shown therein, the system comprises an air compressor 10 having an air inlet 11 and a compressed air outlet 12, a combustor 13 having a fuel inlet 14, a compressed air inlet 15 in fluid communication with compressed air outlet 12 of air compressor 10, and a combustor exhaust gas outlet 16, and a gas turbine 17 having an exhaust gas inlet 18 in fluid communication with combustor exhaust gas outlet 16 of combustor 13, a turbine exhaust gas outlet 19 and a cooling fluid inlet 25. Cooling of the gas turbine is achieved by diverting a portion of the synthesis fuel gas provided to the combustor to the gas turbine for use as a cooling fluid. The benefit compared with conventional steam cooling is improved system thermal efficiency and reduced costs due to the elimination of steam lines. This arrangement may be applied most efficiently for those partial oxidation gas turbines which utilize syngas produced by gasification of solid fuels.

Figure 2:
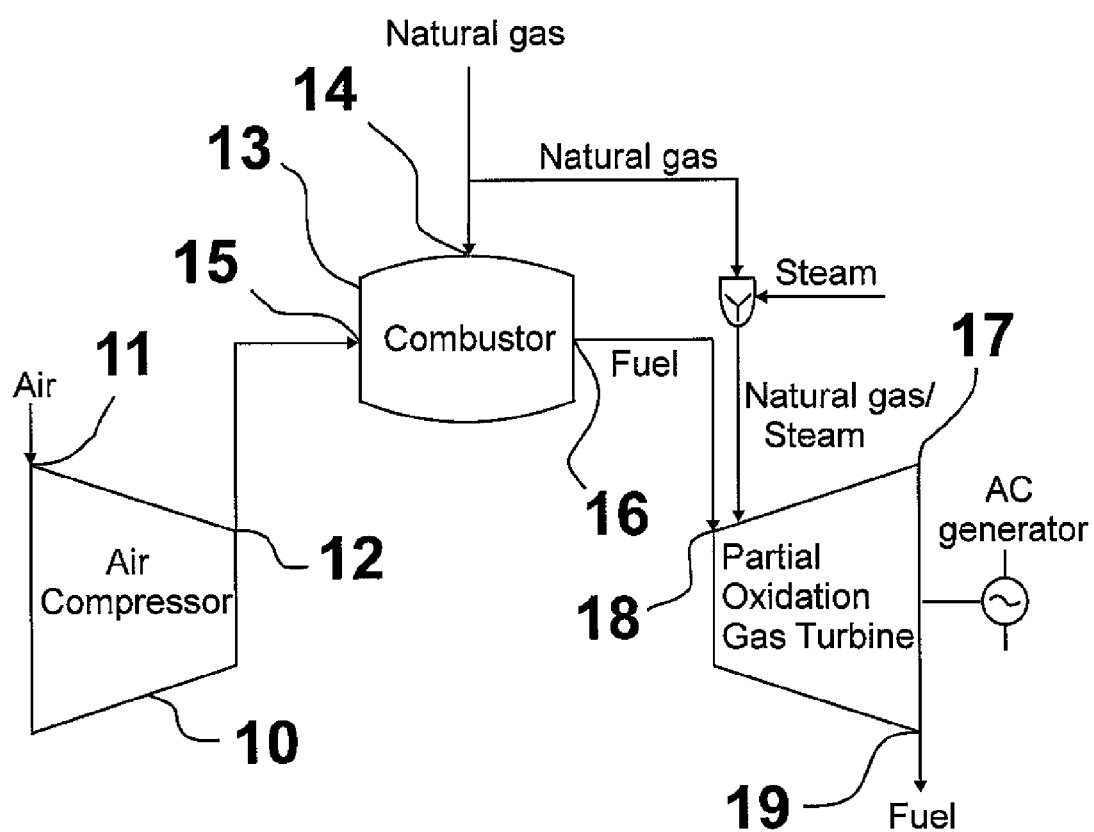
FIG. 2 is a schematic diagram of a power generation system in which natural gas is utilized as a cooling fluid for a partial oxidation gas turbine in accordance with one embodiment of this invention.

FIG. 2 shows a power generation system in accordance with one embodiment of this invention in which conventional steam for cooling is replaced by a mixture of natural gas diverted from the combustor and steam produced, for example, in a bottoming cycle comprising a waste heat recovery boiler. Natural gas is combusted in the partial oxidation reactor (combustor) at substoichiometric conditions, producing an exhaust gas comprising unburned natural gas and combustion products including CO and $CO_2$, but no available oxygen, which is introduced through the exhaust gas inlet into the turbine. One advantage of this embodiment is the reduction in the cooling stream mass requirement due to the additional cooling or heat absorption which occurs in the chemical reaction of natural gas (methane) reforming:

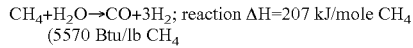
$CH_4 + H_2O \rightarrow CO + 3H_2$; reaction $\Delta H = 207$ kJ/mole $CH_4$
(5570 Btu/lb $CH_4$ This reaction absorbs an additional 5570 Btu/lb $CH_4$ in cooling, which significantly increases cooling efficiency. By way of comparison, only about 500 Btu/lb steam is required to increase steam temperature by 1000° F. from 500° F. to 1500° F. A further benefit of this embodiment is the additional conversion of natural gas into syngas without losses to oxidation. This embodiment is most efficient when applied to those partial oxidation gas turbines which utilize natural gas as a fuel.

Figure 3:
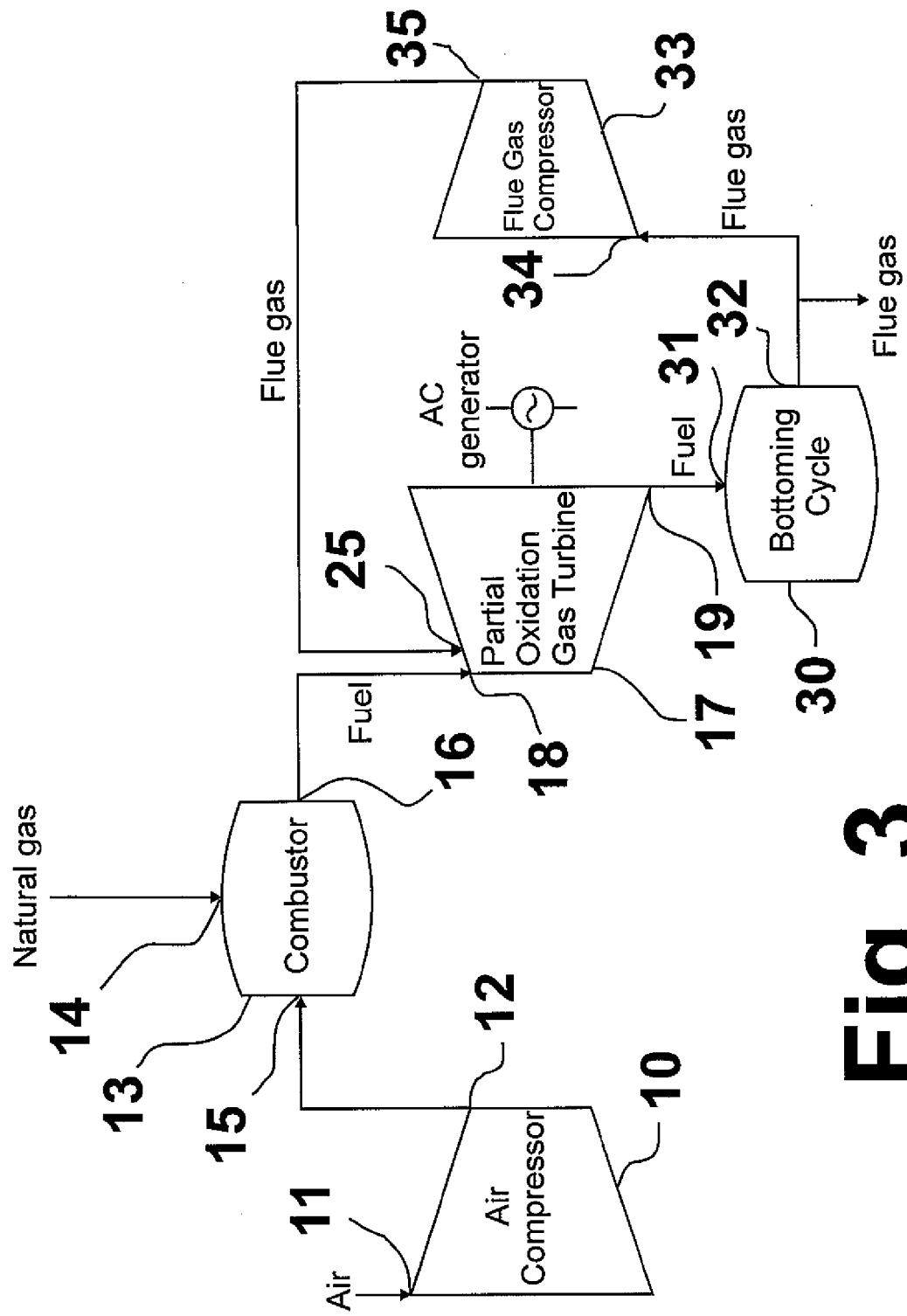
FIG. 3 is a schematic diagram of a power generation system in which flue gas generated by a bottoming cycle is utilized as a cooling fluid for a partial oxidation gas turbine in accordance with one embodiment of this invention.

FIG. 3 shows a power generation system in accordance with one embodiment of this invention comprising a bottoming cycle or waste heat recovery boiler 30 having a turbine exhaust gas inlet 31 in fluid communication with exhaust gas outlet 19 of gas turbine 17 and having a flue gas outlet 32. Flue gas compressor 33 comprising a flue gas inlet 34 in fluid communication with flue gas outlet 32 of waste heat recovery boiler 30 and having a compressed flue gas outlet 35 in fluid communication with cooling fluid inlet 25 of partial oxidation gas turbine 17 provides compressed flue gases for cooling to partial oxidation gas turbine 17. The benefit provided by this embodiment compared with conventional steam cooling is improved system thermal efficiency and is most efficiently applied to partial oxidation gas turbines utilized in plants with implemented $CO_2$ capture and sequestration since available compressed $CO_2$ can be reinjected into the partial oxidation gas turbine for turbine cooling.

Figure 4:
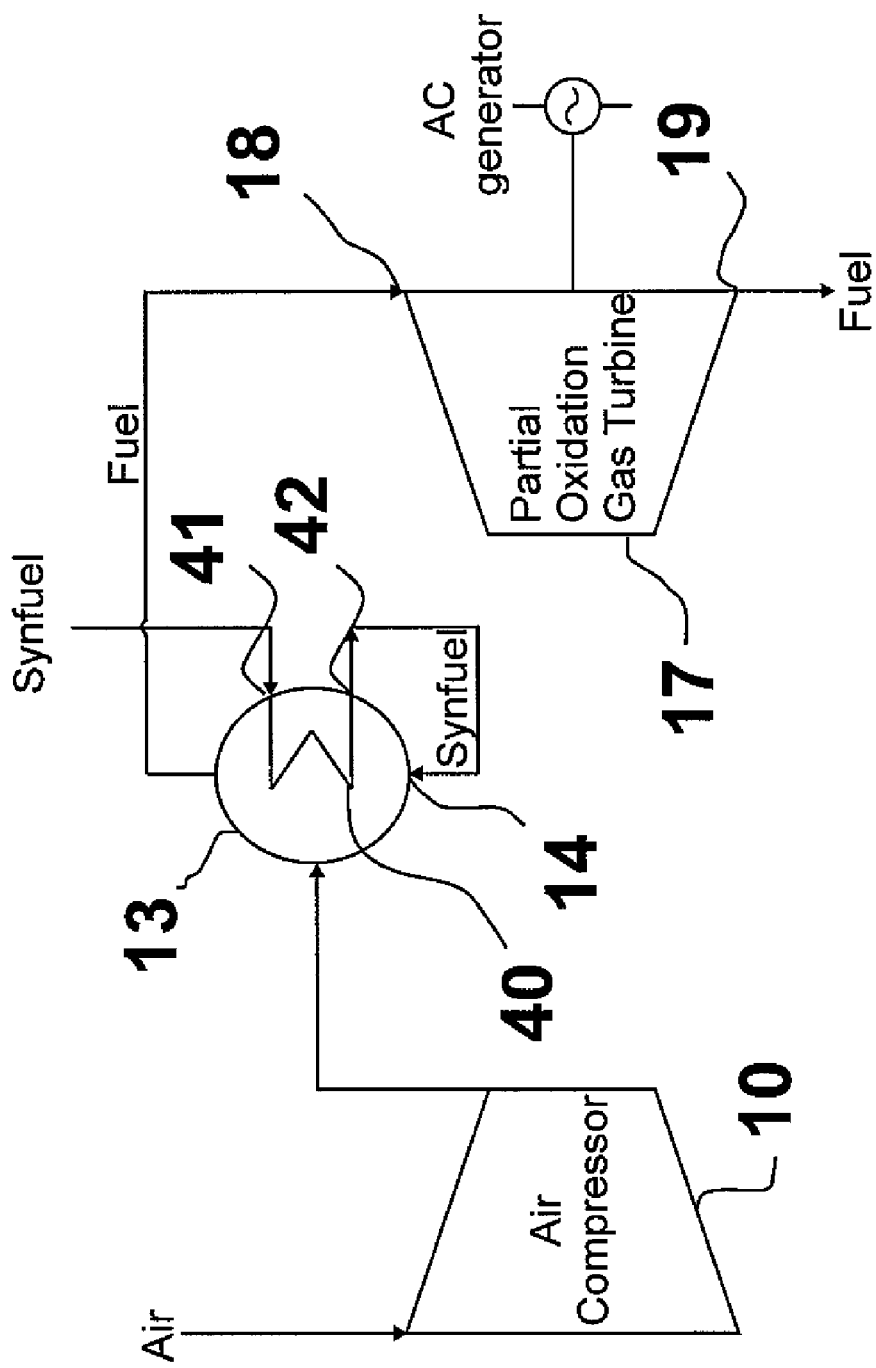
FIG. 4 is a schematic diagram of a power generation system in which a synthesis gas is utilized as a cooling fluid for a turbine combustor in accordance with one embodiment of this invention.

In accordance with one embodiment of this invention, the power generation system of this invention comprises cooling means for cooling the combustor in which the cooling fluid is provided to the combustor. As shown in FIG. 4, the cooling means comprises a heat exchanger 40 in heat exchange relation with combustor 13, heat exchanger 40 comprising cooling fluid inlet 41 and cooling fluid outlet 42. Heat exchanger 40, in accordance with one embodiment of this invention, is a cooling jacket disposed around the combustor. It will, however, be appreciated by those skilled in the art that other types of heat exchangers may be employed, and such heat exchangers are deemed to be within the scope of this invention. In the embodiment shown in FIG. 4, synfuel is employed in place of steam as the cooling fluid and is introduced through cooling fluid inlet 41 into heat exchanger 40 and exits the heat exchanger through cooling fluid outlet 42. The preheated synfuel is then introduced through fuel inlet 14 into combustor 13 in which it is combusted at substoichiometric conditions, producing an exhaust gas having substantially no available oxygen for further reaction. The exhaust gas is then introduced through exhaust gas inlet 18 into gas turbine 17 after which it is exhausted through turbine exhaust gas outlet 19. The benefits provided by this embodiment compared with conventional steam cooling include improved system thermal efficiency, reduced costs due to the elimination of cooling steam lines, and improved combustion stability. This embodiment is most beneficial for those partial oxidation gas turbines which utilize synfuels produced by the gasification of solid fuels.

Figure 5:
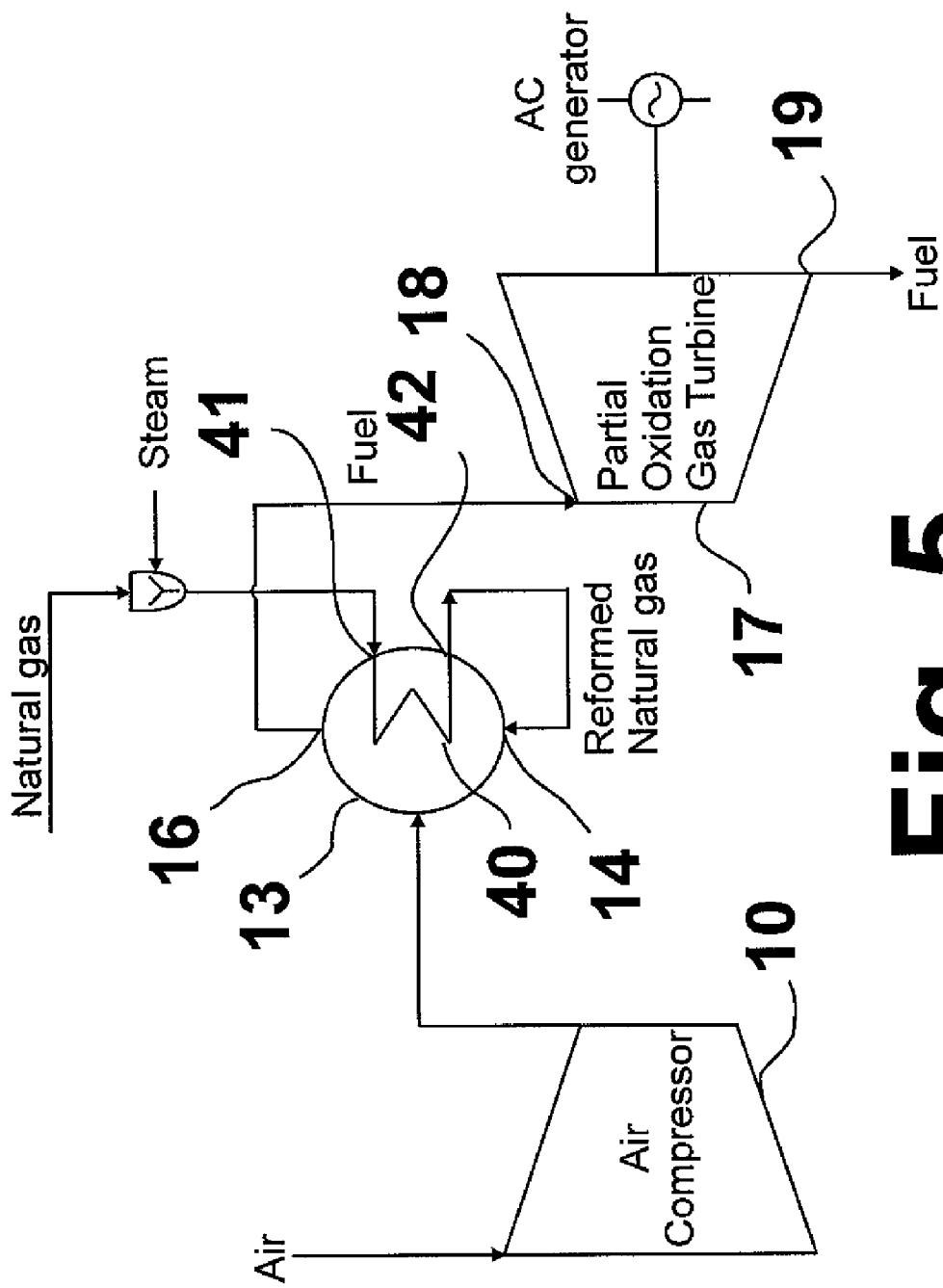
FIG. 5 is a schematic diagram of a power generation system in which a mixture of natural gas and steam, referred to herein as a natural gas/steam mixture, is utilized as a cooling fluid for a turbine combustor in accordance with one embodiment of this invention.

Another embodiment of the power generation system of this invention is shown in FIG. 5, wherein cooling steam is replaced by a mixture of natural gas and steam which is fed through the combustor heat exchanger for combustor cooling. Beneficially, the natural gas is reformed by the steam into syngas after which the preheated syngas is introduced into the combustor. As in the embodiment shown in FIG. 2 in which a natural gas/steam mixture is used as a cooling fluid for cooling the gas turbine, one advantage of this embodiment is the reduction in the cooling stream mass requirement due to the additional cooling or heat absorption which occurs in the chemical reaction of natural gas (methane) reforming as previously discussed.

Figure 6:
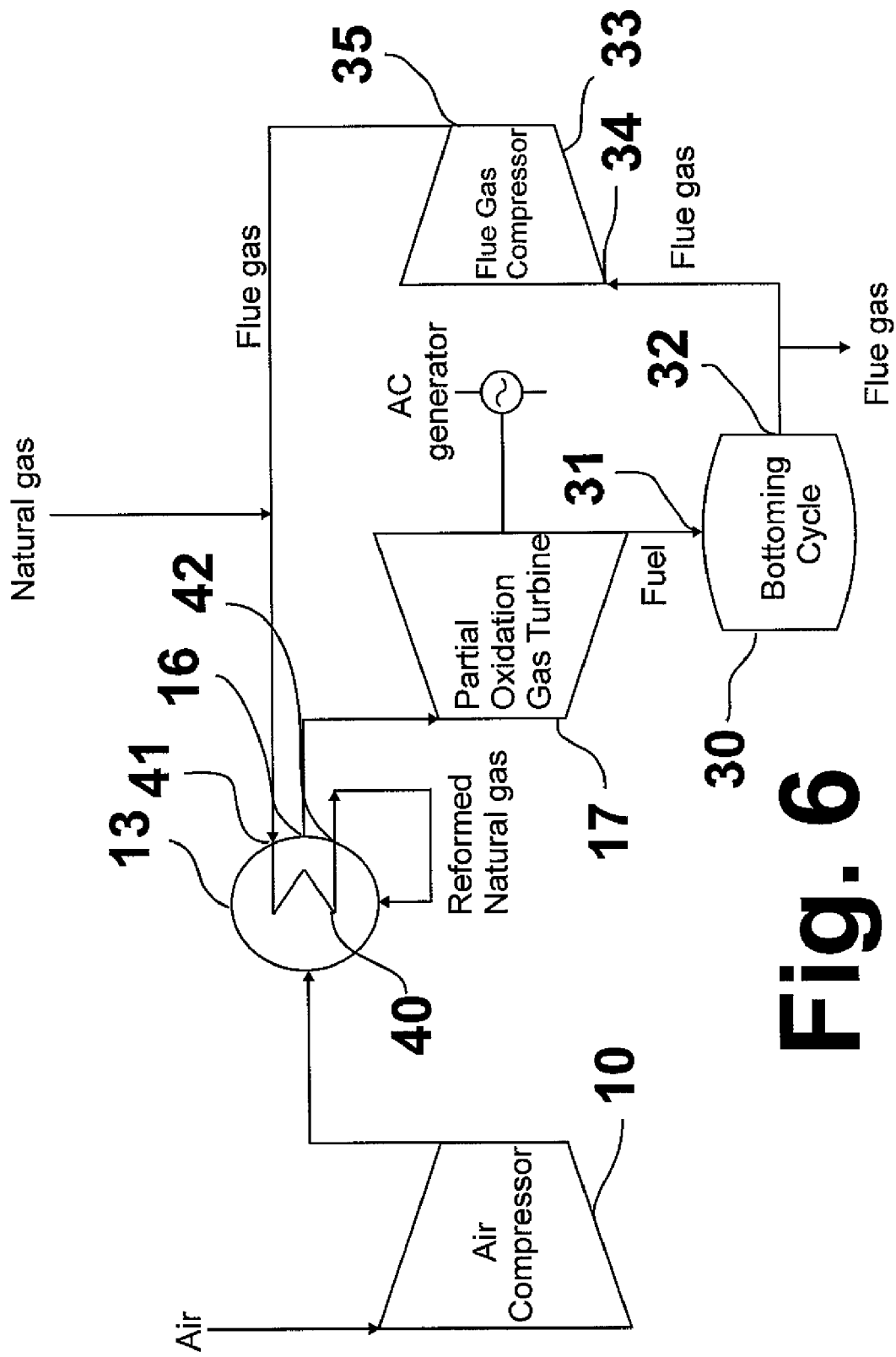
FIG. 6 is a schematic diagram of a power generation system in which flue gas generated by a bottoming cycle is utilized as a cooling fluid for a turbine combustor in accordance with one embodiment of this invention.

Comparable to the embodiment of FIG. 3, FIG. 6 shows one embodiment of the power generation system of this invention in which the exhaust gas from the partial oxidation gas turbine is introduced into a bottoming cycle in which flue gas is produced. As before, the flue gas is compressed in a compressor, but rather than being introduced into the partial oxidation gas turbine for cooling, the compressed flue gas is mixed with natural gas, producing a natural gas/flue gas mixture, which is introduced into the heat exchanger in heat exchange relation with the combustor for cooling of the combustor. As shown in FIG. 6, the natural gas undergoes reforming in the heat exchanger, producing a synfuel which is then introduced into the combustor for combusting at substoichiometric conditions, thereby producing an exhaust gas which is introduced into the partial oxidation gas turbine.

Figure 7:
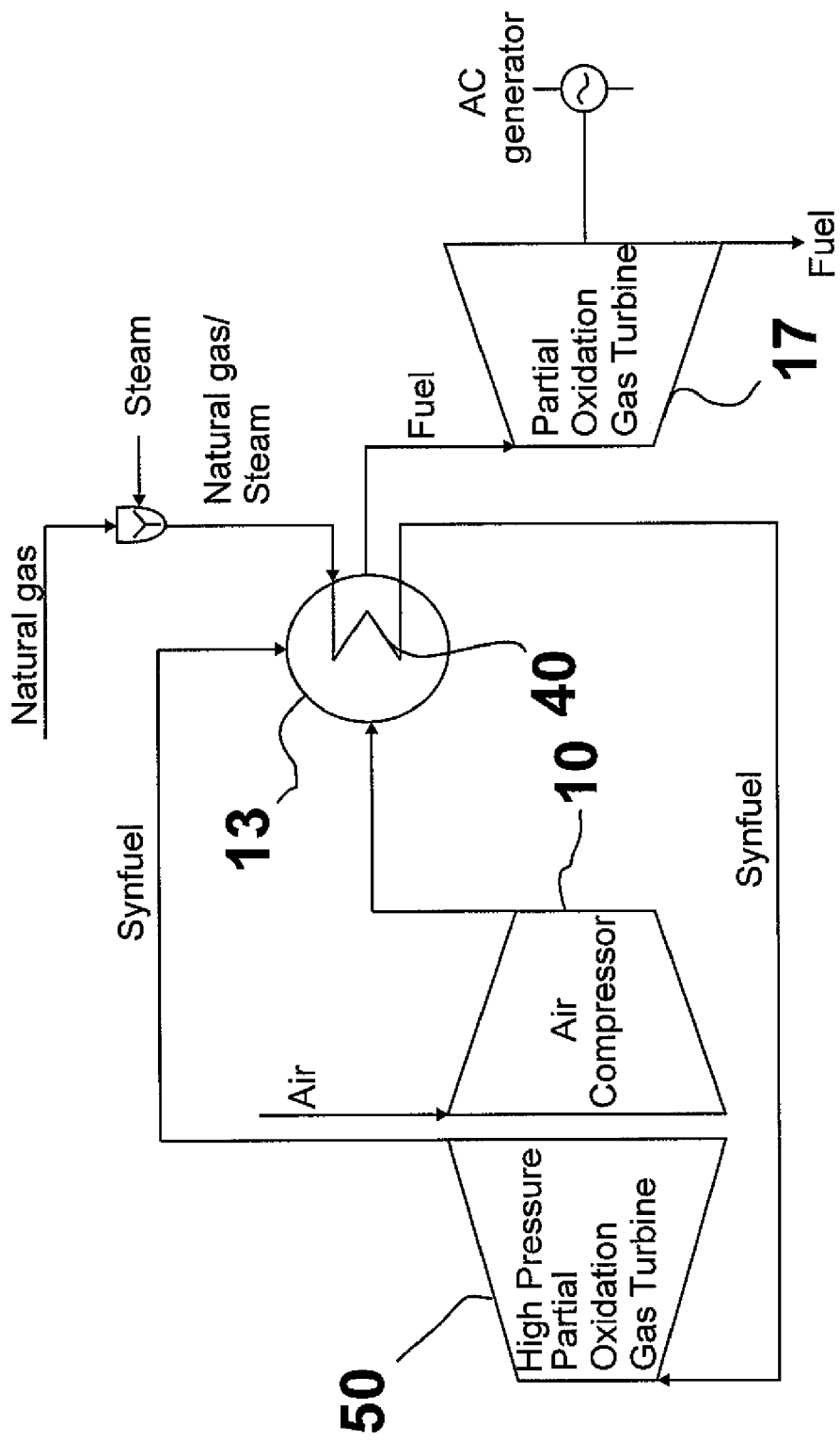
FIG. 7 is a schematic diagram of a power generation system in which a natural gas/steam mixture is utilized as a cooling fluid for a turbine combustor in accordance with another embodiment of this invention.

FIG. 7 shows yet a further embodiment of this invention in which, similar to the embodiment of FIG. 5, cooling steam is replaced by a mixture of natural gas and steam which is fed through the combustor heat exchanger for combustor cooling, resulting in steam reforming of the natural gas into syngas. However, rather than being directly introduced into the combustor, the preheated syngas is introduced into a high pressure partial oxidation gas turbine 50. The high pressure partial oxidation gas turbine may either produce additional power or compress air. The syngas exhausted from the high pressure partial oxidation gas turbine is then introduced into the combustor for combusting at substoichiometric conditions. One advantageous feature of this embodiment is the fact that the reforming reaction increases volumetric gas flow by a factor of two. Higher volumetric flow, in turn, enables the production of more power.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A power generation system comprising:
    an air compressor having an air inlet and a compressed air outlet;
    a combustor having a fuel inlet, a compressed air inlet in fluid communication with said compressed air outlet, and a combustor exhaust gas outlet;
    a gas turbine having an exhaust gas inlet in fluid communication with said combustor exhaust gas outlet and having a turbine exhaust gas outlet; and
    cooling means for cooling at least one of said combustor and said gas turbine, said cooling means comprising a cooling fluid selected from the group consisting of synthesis gas, natural gas, natural gas/steam mixture, flue gas, flue gas/steam mixture, and mixtures thereof and a heat exchanger in heat exchange relationship with said combustor, said heat exchanger having a combustor cooling fluid inlet for receiving said cooling fluid.

2. The power generation system of claim 1, wherein said gas turbine comprises a turbine cooling fluid inlet for receiving said cooling fluid.

3. The power generation system of claim 2 further comprising a waste heat recovery boiler having a turbine exhaust gas inlet in fluid communication with said turbine exhaust gas outlet and having a flue gas outlet in fluid communication with said turbine cooling fluid inlet.

4. The power generation system of claim 3 further comprising a flue gas compressor having a flue gas inlet in fluid communication with said flue gas outlet and having a compressed flue gas outlet in fluid communication with said turbine cooling fluid inlet.

5. The power generation system of claim 1 further comprising a waste heat recovery boiler having a turbine exhaust gas inlet in fluid communication with said turbine exhaust gas outlet and having a flue gas outlet in fluid communication with said combustor cooling fluid inlet.

6. The power generation system of claim 5 further comprising a flue gas compressor having a flue gas inlet in fluid communication with said flue gas outlet and having a compressed flue gas outlet in fluid communication with said combustor cooling fluid inlet.

7. The power generation system of claim 1 further comprising a high pressure gas turbine having a fuel gas inlet in fluid communication with a combustor cooling fluid outlet of said heat exchanger and having a fuel gas outlet in fluid communication with said fuel inlet of said combustor.

8. A method of power generation comprising the steps of:
    introducing a fuel gas into a combustor having a fuel gas inlet and a combustor exhaust gas outlet;
    combusting at least a portion of said fuel gas at substoichiometric conditions in said combustor, producing an exhaust gas having no appreciable free oxygen;
    introducing said exhaust gas into a gas turbine having a turbine exhaust gas inlet and a turbine exhaust gas outlet, thereby generating power; and
    cooling at least one of said combustor and said gas turbine with a cooling fluid selected from the group consisting of synthesis gas, natural gas, natural gas/steam mixture, flue gas, flue gas/steam mixture, and mixtures thereof.

9. The method of claim 8, wherein a portion of said fuel gas is diverted for use as said cooling fluid.

10. The method of claim 8, wherein said fuel gas is natural gas and a portion of said natural gas is mixed with steam, forming a natural gas/steam mixture, and said mixture is used as said cooling fluid.

11. The method of claim 8, wherein said exhaust gas in said gas turbine is exhausted through said turbine exhaust gas outlet and introduced into a waste heat recovery boiler, forming a flue gas.

12. The method of claim 11, wherein said flue gas is exhausted from said waste heat recovery boiler and introduced as said cooling fluid into one of said gas turbine and a heat exchanger in heat exchange relationship with said combustor.

13. The method of claim 8, wherein said fuel gas is introduced into a heat exchanger in heat exchange relationship with said combustor, said heat exchanger having a heat exchange fuel gas inlet and a heat exchange fuel gas outlet, producing a preheated fuel gas, and said preheated fuel gas is introduced into said combustor.

14. The method of claim 13, wherein said fuel gas is a natural gas/steam mixture and said natural gas is reformed in said heat exchanger, forming a reformed fuel gas.

15. The method of claim 14, wherein said reformed fuel gas is introduced into said combustor for combustion.

16. The method of claim 14, wherein said reformed fuel gas is introduced into a high pressure gas turbine having a reformed fuel gas inlet and a reformed fuel gas outlet followed by introduction into said combustor for combustion.

\* \* \* \* \*